US008055782B2

(12) United States Patent
Hickson et al.

(10) Patent No.: US 8,055,782 B2
(45) Date of Patent: Nov. 8, 2011

(54) SYSTEM AND METHOD FOR GENERATING EXCEPTION DELAY MESSAGES WHEN MESSAGES ARE DELAYED

(75) Inventors: Andrew Hickson, Winchester (GB); Andrew David Akehurst, Southampton (GB); Nigel Goddard, Southampton (GB); Andrew Anthony Emmett, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/250,429

(22) Filed: Oct. 13, 2008

(65) Prior Publication Data
US 2010/0094933 A1 Apr. 15, 2010

(51) Int. Cl.
*G06F 15/16* (2006.01)
*G06F 15/173* (2006.01)
(52) U.S. Cl. .................. 709/230; 709/223; 709/224
(58) Field of Classification Search .............. 709/223, 709/224, 230
See application file for complete search history.

(56) References Cited

U.S. PATENT DOCUMENTS

| 5,123,029 | A | * | 6/1992 | Bantz et al. ............... 375/133 |
| 6,058,389 | A | * | 5/2000 | Chandra et al. ................ 1/1 |
| 6,094,694 | A | * | 7/2000 | Hickson et al. ............. 710/54 |
| 6,122,277 | A | | 9/2000 | Garmire et al. |
| 7,027,773 | B1 | | 4/2006 | McMillin |
| 7,411,908 | B2 | * | 8/2008 | Liu et al. ................... 370/232 |
| 2003/0105800 | A1 | * | 6/2003 | Cullen ....................... 709/201 |
| 2006/0129561 | A1 | * | 6/2006 | Chobert et al. ............... 707/10 |
| 2006/0218238 | A1 | * | 9/2006 | Critchley et al. ........... 709/207 |
| 2007/0032200 | A1 | * | 2/2007 | Taneja ........................ 455/70 |
| 2007/0116027 | A1 | * | 5/2007 | Ciavaglia et al. ........... 370/412 |
| 2007/0253449 | A1 | * | 11/2007 | Das et al. ................... 370/498 |
| 2008/0013450 | A1 | * | 1/2008 | Worley et al. .............. 370/230 |
| 2008/0026776 | A1 | * | 1/2008 | Neil et al. .................. 455/466 |
| 2009/0003552 | A1 | * | 1/2009 | Goldman et al. .......... 379/88.22 |
| 2009/0122808 | A1 | * | 5/2009 | Sharif-Ahmadi et al. ... 370/458 |
| 2009/0320044 | A1 | * | 12/2009 | Dar et al. ................... 719/314 |
| 2010/0017441 | A1 | * | 1/2010 | Todd .......................... 707/200 |

* cited by examiner

*Primary Examiner* — Hieu Hoang
(74) *Attorney, Agent, or Firm* — King & Spalding

(57) ABSTRACT

Generating exception delay messages when messages communicated between asynchronous messaging applications are delayed and for forcibly retaining the original message. Specifically, the invention provides methods and systems for generating an exception delay message after a time threshold has expired without deleting the original message. The exception delay message may be sent once when the time threshold first expires or each time that the time threshold expires.

9 Claims, 5 Drawing Sheets

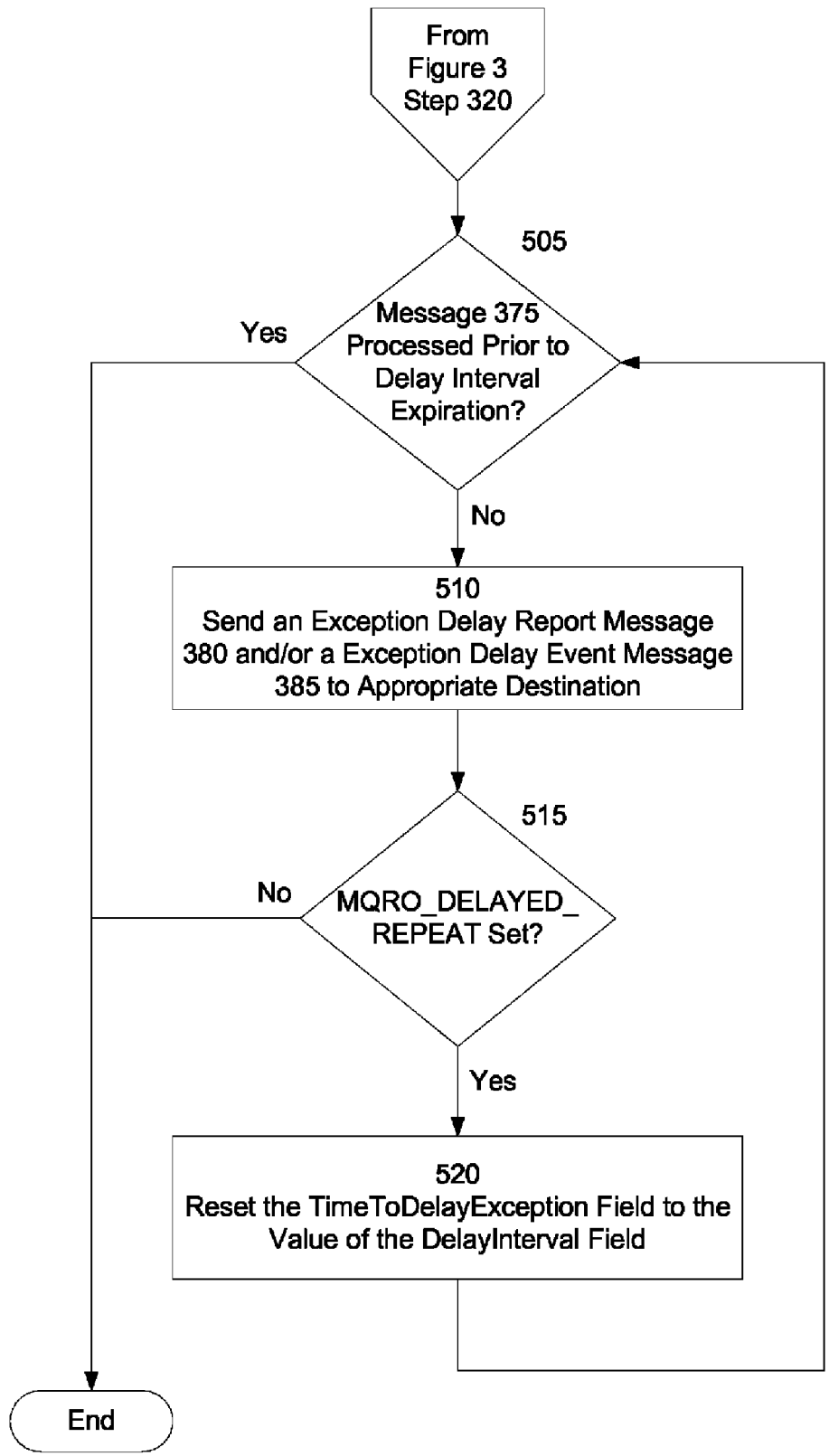

SYSTEM AND METHOD FOR GENERATING EXCEPTION DELAY MESSAGES WHEN MESSAGES ARE DELAYED

FIELD OF THE INVENTION

The present disclosure relates generally to the field of asynchronous messaging, and more particularly to methods and systems for generating exception delay messages when messages are not processed in a timely manner.

BACKGROUND

Asynchronous messaging involves communication between two or more applications. This communication is accomplished by way of putting and getting messages. The applications may attach to the same or different message queue managers, which are entities that manage receiving, storing, and transmitting messages. The message queue managers may be hosted on the same or different nodes in a computer network.

When a message is put, it is possible for the processing of that message to be delayed. The message might be delayed at the source message queue manager, the destination message queue manager, or any message queue manager through which the message passes.

Current solutions to message delays typically involve generating an expiry message to communicate that the original message has not been delivered and instead has been deleted. The application that receives the expiry message is typically the application that generated the original message and typically takes an application specific action upon receipt of the expiry message. Such actions may include raising an alert and regenerating the original message.

What is needed is a method for effectively processing messages that have been delayed without deleting the original message.

SUMMARY

The present invention provides methods and systems for generating exception delay messages when messages communicated between asynchronous messaging applications are delayed and for forcibly retaining the original message.

An aspect of the present invention provides a method for generating a second message. This method includes the steps of putting a first message including a time threshold data item; determining whether the time threshold data item has expired; generating, in response to the determination that the time threshold data item has expired, the second message, where the second message indicates that the time threshold data item has expired; and forcibly retaining the first message.

Another aspect of the invention provides a system for generating a second message. This system includes a first message including a time threshold data item; message queues for storing messages; message queue managers for transmitting, receiving, and storing messages in the message queues and determining whether a time threshold data item of a message has expired, where each message queue manager is operable to transmit a first message, including a time threshold data item; determine whether the time threshold data item has expired; generate in response to the determination that the time threshold data item has expired, the second message, where the second message indicates that the time threshold data item has expired; and forcibly retaining the first message.

BRIEF DESCRIPTION OF THE DRAWINGS

FIG. 5 provides a flow diagram with greater detail of a delayed message sending step of FIG. 3 in accordance with certain exemplary embodiments.

DETAILED DESCRIPTION OF EXEMPLARY EMBODIMENTS

The present invention provides methods and systems for generating exception delay messages when messages communicated between asynchronous messaging applications are delayed and for forcibly retaining the original message. Specifically, the invention provides methods and systems for generating an exception delay message after a time threshold has expired without deleting the original message. The exception delay message may be sent once when the time threshold first expires or each time that the time threshold expires.

Turning now to the drawings, in which like numerals indicate like elements throughout the figures, exemplary embodiments of the invention are described in detail.

Figure 1:
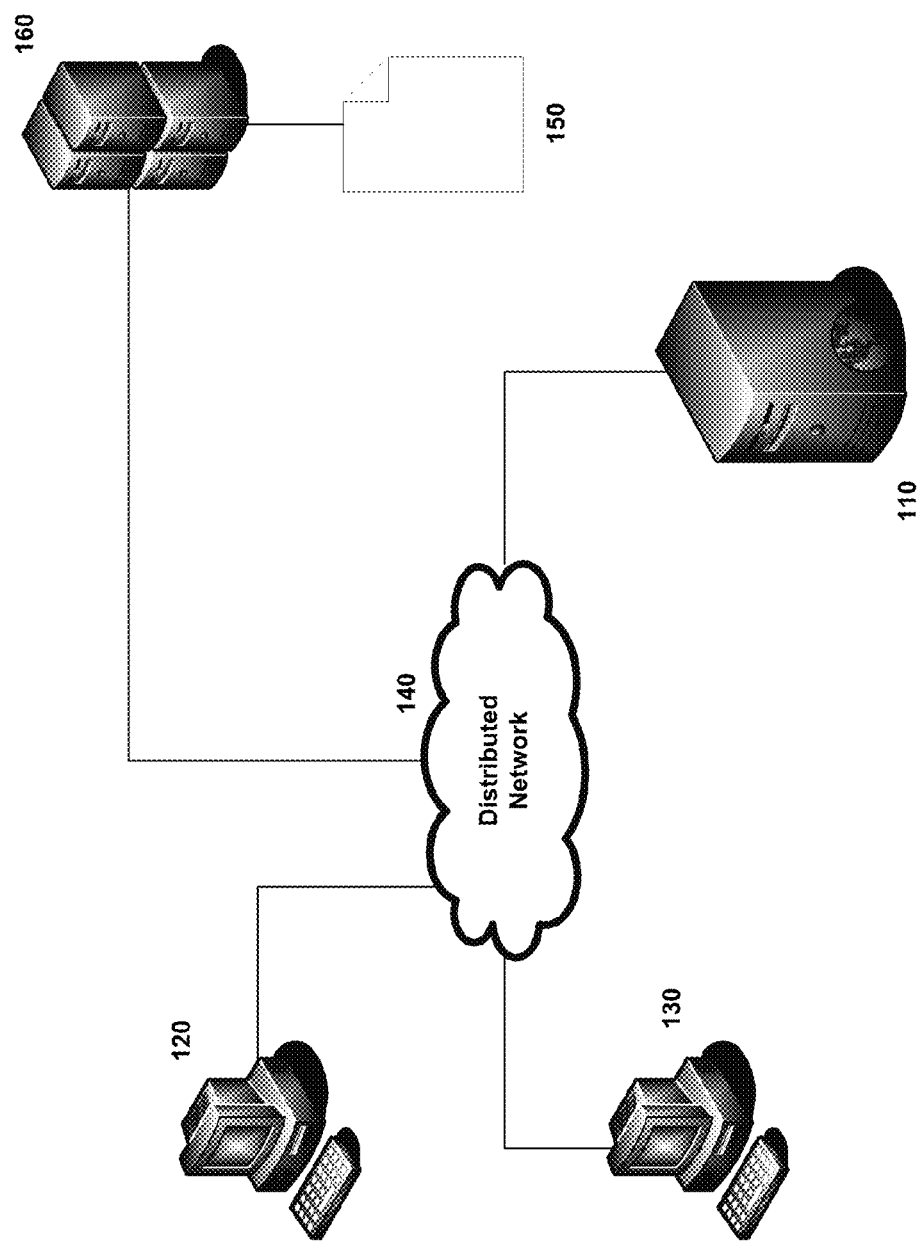
FIG. 1 depicts an operating environment in accordance with certain exemplary embodiments.

FIG. 1 depicts an operating environment 100 in accordance with certain exemplary embodiments. Referring to FIG. 1, a web server 110 is connected to a distributed network 140, such as the Internet. Connected to the web server 110 through the distributed network 140 are client devices, such as a conventional computer 120 and a conventional computer 130. Of course, any number of client devices may be connected to the web server 110 through the distributed network 140. These client devices may include other conventional computers (not shown) and mobile communications devices (not shown).

An applications server 160 is also connected to the distributed network 140. The distributed network 140 may be a local area network (LAN), private wide area network (WAN), or other network and is not restricted to the World Wide Web.

The applications server 160 may include one or more applications programs that utilizes messaging such as applications program 150. The applications server 160 may be connected to additional hardware that supports these programs. Alternatively, this messaging method may be associated with the web server 110, one or more other servers (not shown), or simply with a conventional computer 120.

Figure 2:
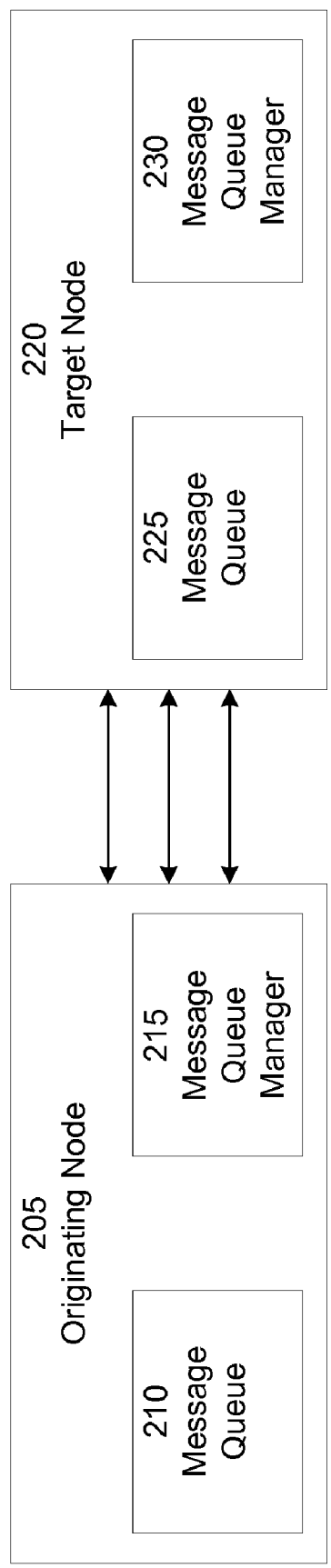
FIG. 2 is a block diagram illustrating the communication of messages between two nodes in accordance with certain exemplary embodiments.

FIG. 2 is a block diagram illustrating the communication of messages between two nodes in accordance with certain exemplary embodiments. Referring to FIGS. 1 and 2, the originating node 205 can be either conventional computer 120, conventional computer 130, applications server 160, web server 110 or another computer (not shown). Target node 220 can be a second node on the distributed network 140, either conventional computer 120, conventional computer 130, applications server 160, web server 110 or another computer (not shown). Target node 220 can be the same node or a different node than originating node 205.

A node is defined as an element of a computer network where messages can be transmitted, received or forwarded. A node can be a conventional computer 120 or 130, applications server 160, web server 110, personal digital assistant (not shown), router (not shown), switch (not shown) or any other device capable of connecting to a computer network.

An application program on a node can send or receive data from another node by way of messages. A message is defined as a collection of data that has meaning to a participating program. A message includes a message properties and a message payload. Message properties may include user and system properties. System properties may contain routing, storage, and delivery information.

Message queues 210, 225 are objects in an application that store messages that are waiting to be sent or processed. A message queue 210, 225 is controlled by a message queue manager 215, 230. The message queue manager 215, 230 handles functions including storage and timing issues. Message queue managers 215, 230 communicate by way of direct software connection or by way of a network. Message queue managers 215, 230 use one or more channels to communicate with other message queue managers 215, 230.

Figure 3:
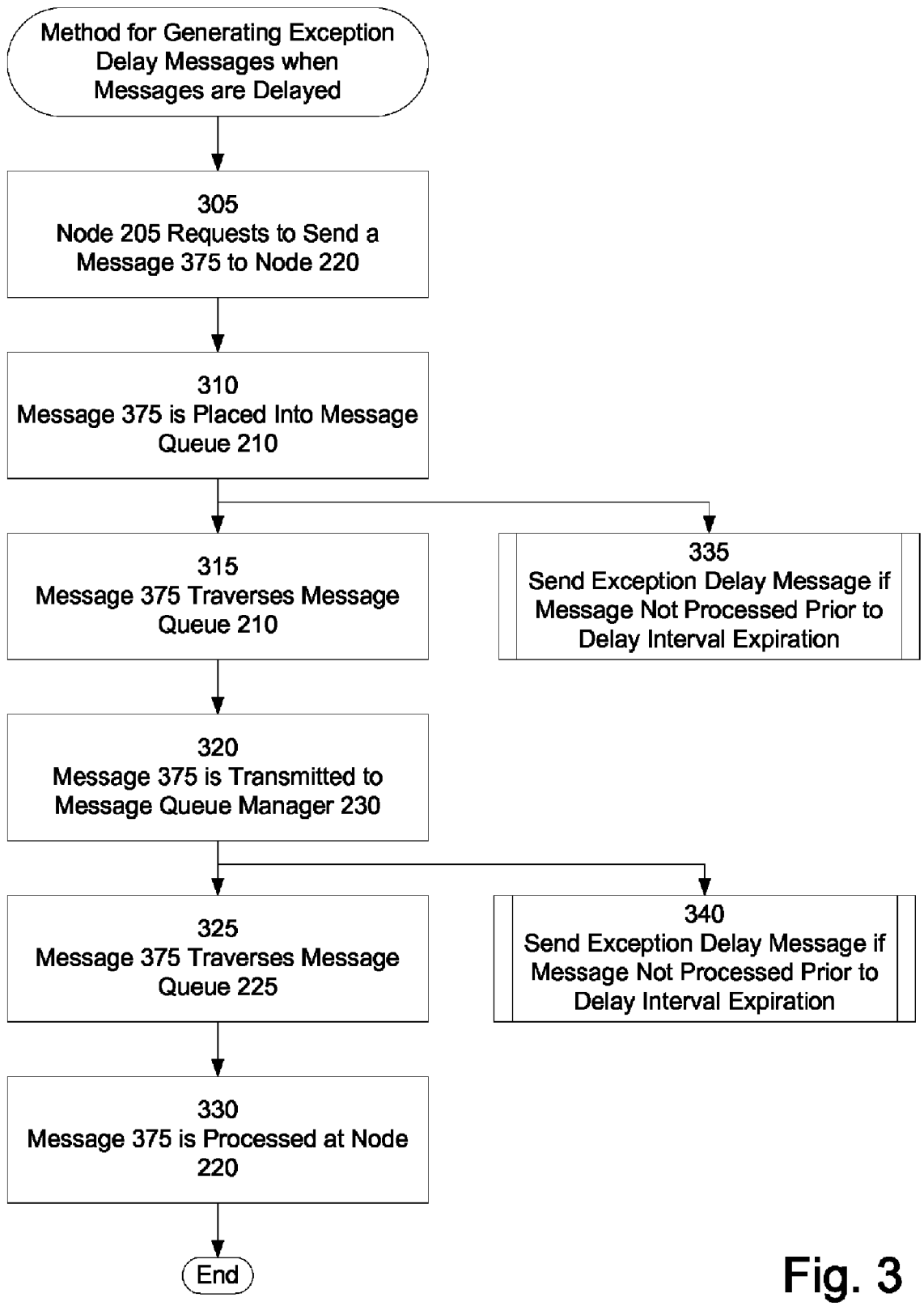
FIG. 3 provides a flow diagram for generating exception delay messages in accordance with certain exemplary embodiments.

FIG. 3 provides a flow diagram 300 for generating exception delay messages in accordance with certain exemplary embodiments. Referring to FIGS. 1, 2, and 3, at step 305, the originating node 205 begins the process of transmitting a message 375 to the target node 220. The originating node 205 creates the message 375 and at step 310, the message queue manager 215 places the message 375 into the message queue 210.

In one exemplary embodiment of the present invention, the message properties contain attributes including a delay interval (DelayInterval), a time to delay exception (TimeToDelayException), an option to create a second message once when the delay interval expires (MQRO_DELAYED), an option to create a second message each time the delay interval expires (MQRO_DELAYED_REPEAT), an option that requests that the second message is sent to a message queue on the target node (MQRO_DELAYED_REPLY), and an option that requests that the second message is sent to a message queue on the node where the event occurs (MQRO_DELAYED_EVENT).

After the message 375 is placed into the message queue 210, steps 315 and 335 become active. At step 315, the message queue manager 215 sends each message in the message queue 210 in an order determined by the message queue manager 215 or an application program. In one exemplary embodiment, the message queue manager 215 may transmit messages based on when the messages were placed into the message queue 210. In another exemplary embodiment, the messages may be sent based on a priority rating for each message. Once the message 375 reaches the front of the message queue 210, step 320 becomes active.

While the message 375 is in the message queue 210, step 335 is executed to generate a second message if the original message 375 is not processed in a timely manner, that is a second message is generated when a time threshold expires. This second message is referred to herein as an exception delay message and can be an exception delay report message 380 or an exception delay event message 385. The original message 375 is not deleted or replaced by the exception delay message, instead the original message 375 remains until the message 375 is processed at the target node 220. Step 335 is detailed below in connection with FIG. 4.

At step 320, the message queue manager 215 transmits the message 375 to the message queue manager 230 of target node 220. The message queue manager 230 may place the message 375 into the message queue 225 to await processing.

After the message 375 is placed into the message queue 225, step 340 is executed to generate an exception delay message if the original message 375 is not processed by message queue manager 230 before a time threshold expires. Step 340 is detailed below in connection with FIG. 5.

At step 325, the message queue manager 230 processes each message in the message queue 225 in an order determined by the message queue manager 230 or an application program. In one exemplary embodiment, the message queue manager 230 may process messages based on when the messages were placed into the message queue 225. In another exemplary embodiment, the messages may be processed based on a priority rating. Once the message 375 reaches the front of the message queue 225, step 330 becomes active.

At step 330, the message 375 is successfully processed by the node 220.

Figure 4:
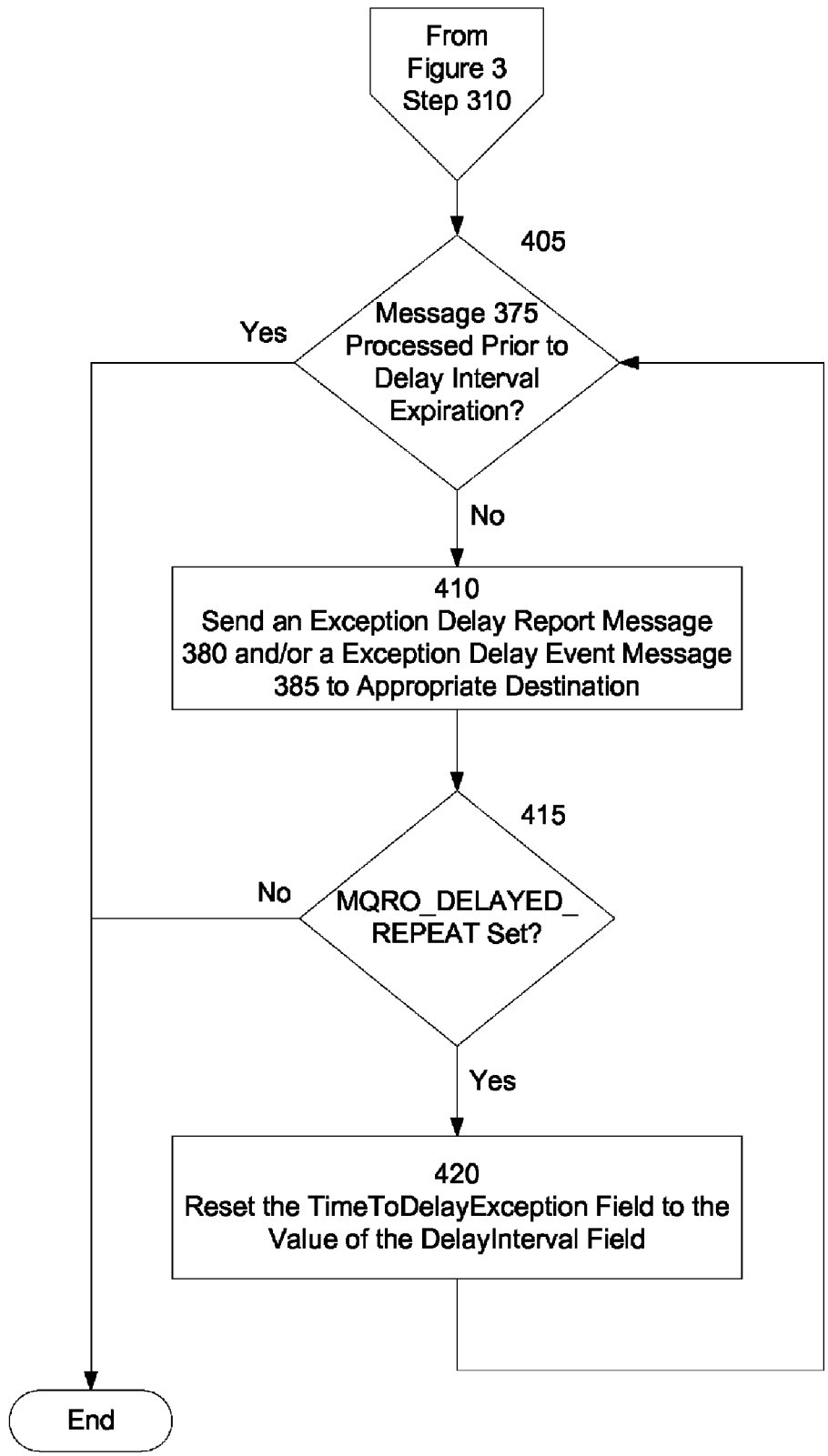
FIG. 4 provides a flow diagram with greater detail of a delayed message sending step of FIG. 3 in accordance with certain exemplary embodiments.

FIG. 4 provides a flow diagram with greater detail of the delayed message sending step 335 of FIG. 3 in accordance with certain exemplary embodiments.

At step 405, the message queue manager 215 compares how long the message 375 has been awaiting processing in the message queue 210 to the TimeToDelayException field in the properties of the message 375. While the message queue 210 contains the message 375, the message queue manager 215 of the message queue 210 decrements the TimeToDelayException field. If the message 375 is processed before the TimeToDelayException field is decremented to zero, then no exception delay message will be generated. If the message 375 is not processed before the TimeToDelayException field is decremented to zero, step 410 becomes active. The timing mechanism used to determine whether a message has been delayed is similar to the timing mechanism used to determine whether a message has expired.

When the original message 375 is generated, the TimeToDelayException field is initially set to the value in the DelayInterval field. When the message 375 is transferred from one node to another, the header field TimeToDelayException will reflect the interval before the next exception delay message is required to be generated. Because this time is transferred between nodes as an interval, no clock skew considerations are needed. For example, the message 375 may be generated with a DelayInterval field set to 30 seconds. The value in the TimeToDelayException field will be initialized to 30 seconds. If the message 375 is created in node 205, the message queue manager 215 will decrement the value in the TimeToDelayException field until the message is transferred out of message queue 210. If after 10 seconds, the message is transferred from message queue 210 to message queue 225, the message will arrive at the message queue 225 with a value of 20 seconds in the TimeToDelayException field of the message 375. The message queue manager 230 will then decrement the TimeToDelayException field of message 375 from 20 seconds until the value of the TimeToDelayException field reaches zero or the message 375 is processed at node 220. The method used to transfer and update the TimeToDelayException field similar to that used for the Expiry field.

If the message 375 is routed through an intermediate message queue (not shown), the message queue manager of the intermediate message queue would decrement the TimeToDelayException field until the value in the TimeToDelayException field is decremented to zero or the message is transmitted out of the intermediate message queue.

At step 410, an exception delay message is generated by the message queue manager 215. Depending on the properties of the original message 375, the message queue manager 215 sends an exception delay report message 380 to the message queue manager specified in the message properties of the message 375 and/or an exception delay event message 385 to the event destination specified in the message properties. An exception delay report message 380 is sent to the specified report destination if MQRO_DELAYED_REPLY is set active, and/or an exception delay event message 385 is sent to the specified event destination if MQRO_DELAYED_EVENT is set active. The message 375 remains in its present message queue 210 and is not deleted. That is, the message 375 is forcibly retained in the present message queue 210. After the exception delay report message 380 and/or the exception delay event message 385 is sent to the specified destination, step 415 becomes active.

If the message 375 is routed through an intermediate message queue (not shown), the message queue manager of the intermediate message queue would generate the exception delay report message 380 and/or the exception delay event message 385 when the delay interval expires.

When an exception delay message is generated, the message properties of the exception delay message may be extended or may be pre-pended by a new message header. A message header of the exception delay message may contain data fields in addition to the standard header fields. The additional message properties or header fields of an exception delay message may comprise a target queue, target queue manager, reply to queue, reply to queue manager, host queue, host queue manager, original put time/date, and put data.

At step 415, if message properties field MQRO_DELAYED_REPEAT of the original message 375 is set active to allow an exception delay message to be sent each time the TimeToDelayException field expires, optional step 420 becomes active. Alternatively, if field MQRO_DELAYED_REPEAT is not active, the sequence ends.

At step 420, the message queue manager 215 that contains the message 375 resets the TimeToDelayException field in the message properties to the value of the DelayInterval field. After the TimeToDelayException field is reset, step 405 becomes active. In this exemplary embodiment, if the MQRO_DELAYED_REPEAT field is set active, each time that the TimeToDelayException field expires, step 410 is repeated. Therefore, each time the TimeToDelayException field expires before the original message 375 is processed, an exception delay message is generated.

FIG. 5 provides a flow diagram with greater detail of a delayed message sending step 340 of FIG. 3 in accordance with certain exemplary embodiments.

At step 505, the message queue manager 230 compares how long the message 375 has been awaiting processing in the message queue 225 to the TimeToDelayException field in the properties of the message 375. While the message queue 225 contains the message 375, the message queue manager 230 of the message queue 225 decrements the TimeToDelayException field. If the message 375 is processed before the TimeToDelayException field is decremented to zero, then no exception delay message will be generated. If the message 375 is not processed before the TimeToDelayException field is decremented to zero, step 510 becomes active.

At step 510, an exception delay message is generated by the message queue manager 230. Depending on the properties of the original message 375, the message queue manager 230 sends an exception delay report message 380 to the message queue manager specified in the message properties of the message 375 and/or an exception delay event message 385 to the event destination specified in the message properties. An exception delay report message 380 is sent to the specified report destination if MQRO_DELAYED_REPLY is set active, and/or an exception delay event message 385 is sent to the specified event destination if MQRO_DELAYED_EVENT is set active. The message 375 remains in its present message queue 225 and is not deleted. That is, the message 375 is forcibly retained in the present message queue 225. After the exception delay report message 380 and/or the exception delay event message 385 is sent to the specified destination, step 515 becomes active.

At step 515, if message properties field MQRO_DELAYED_REPEAT of the original message 375 is set active to allow an exception delay message to be sent each time the TimeToDelayException field expires, optional step 520 becomes active. Alternatively, if field MQRO_DELAYED_REPEAT is not active, the sequence ends.

At step 520, the message queue manager 230 that contains the message 375 resets the TimeToDelayException field in the message properties to the value of the DelayInterval field. After the TimeToDelayException field is reset, step 505 becomes active. In this exemplary embodiment, if the MQRO_DELAYED_REPEAT field is set active, each time that the TimeToDelayException field expires, step 510 is repeated. Therefore, each time the TimeToDelayException field expires before the original message 375 is processed, an exception delay message is generated.

When exception delay messages are sent to the appropriate message queue manager event queue, it is easy for an alert to be raised indicating that individual messages are not flowing through the system correctly. This capability is especially useful for system queues that host a wide variety of message types with differing response time goals where the existing event mechanisms are too coarse. For example, it might be expected that some very old messages could exist in a message queue without indicating a real problem. The presence of the very old messages would make it difficult for current performance event monitoring capabilities to identify that some other message should have passed through the queue in a more timely manner.

One of ordinary skill in the art would appreciate that the present invention provides methods and systems for generating exception delay messages when messages communicated between asynchronous messaging applications are delayed and for forcibly retaining the original message. Specifically, the invention provides methods and systems for generating an exception delay message after a time threshold has expired without deleting the original message. The exception delay message may be sent once when the time threshold first expires or each time that the time threshold expires. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims that follow.

What is claimed is:

1. A method for processing of delayed messages, the method comprising the steps of:
    putting, by a computer, a first message in a first message queue managed by a first message queue manager, the first message comprising a time threshold data item comprising a delay time interval;
    setting the delay time interval to an initial time value;
    decrementing, by the first message queue manager, the delay time interval while the first message awaits processing in the first message queue;
    determining, by the first message queue manager, whether the decremented delay time interval has expired and the first message is not processed by the first message queue manager;

in response to determining that the decremented delay time interval has expired and the first message is not processed by the first message queue manager:
- generating, by the first message queue manager, a second message, wherein the second message indicates that the decremented delay time interval has expired;
- notifying an entity at a specified destination that the decremented delay time interval has expired and the first message is not processed by the first message queue manager by sending the second message to the specified destination;
- retaining the first message in the first message queue until the first message is processed by the first message queue manager;

sending the first message from the first message queue to a second message queue managed by a second message queue manager, the first message comprising the decremented delay time interval;

further decrementing, by the second message queue manager, the decremented delay time interval while the first message awaits processing in the second message queue;

determining, by the second message queue manager, whether the decremented delay time interval has expired and the first message is not processed by the second message queue manager;

generating, by the second message queue manager, in response to determining that the decremented delay time interval has expired and the first message is not processed by the second message queue manager, a third message;

notifying the entity that the decremented delay time interval has expired and the first message is not processed by the second message queue manager by sending the third message to the specified destination; and retaining the first message in the second message queue until the first message is processed by the second message queue manager.

2. The method claim 1, wherein the amount of time before the decremented delay time interval expires is passed within the first message to the second message queue manager when the first message in transferred from the first message queue manager to the second message queue manager.

3. The method of claim 1, further comprising:
- resetting the decremented delay time interval to the initial time value each time that the decremented delay time interval expires; and
- generating the second message each time that the decremented delay time interval expires.

4. The method of claim 1, further comprising sending the second message to a message queue of a target node for the first message.

5. The method of claim 1, further comprising sending the third message to the first message queue manager.

6. A computer program product for processing of delayed messages, the computer program product comprising:
- a non-transitory computer-readable storage medium having computer-readable program code embodied therein, the computer-readable program code for:
  - putting a first message in a first message queue, the first message comprising a time threshold data item comprising a delay time interval;
  - setting the delay time interval to an initial time value;
  - decrementing the delay time interval while the first message awaits processing in the first message queue;
  - determining whether the decremented delay time interval has expired and the first message is not processed in the first message queue;
  - generating, in response to determining that the time interval has expired and the first message is not processed in the first message queue, a second message, wherein the second message indicates that the time interval has expired;
  - notifying an entity at a specified destination that the decremented delay time interval has expired and the first message is not processed in the first message queue by sending the second message to the specified destination; and
  - retaining, in response to determining that the time interval has expired, the first message in the first message queue until the first message is processed in the first message queue;
  - sending the first message from the first message queue to a second message queue, the first message comprising the decremented delay time interval;
  - further decrementing the decremented delay time interval while the first message awaits processing in the second message queue;
  - determining whether the decremented delay time interval has expired and the first message is not processed in the second message queue;
  - generating, in response to determining that the decremented delay time interval has expired and the first message is not processed in the second message queue, a third message;
  - notifying the entity that the decremented delay time interval has expired and the first message is not processed in the second message queue by sending the third message to the specified destination; and
  - retaining the first message in the second message queue until the first message is processed in the second message queue.

7. The computer program product claim 6, wherein the amount of time before the decremented delay time interval expires is passed within the first message to the second message queue when the first message in transferred from the first message queue to the second message queue.

8. The computer program product of claim 6, wherein the computer-readable program code is further for:
- resetting the decremented delay time interval to the initial time value each time that the decremented delay time interval expires; and
- generating the second message each time that the decremented delay time interval expires.

9. The computer program product of claim 6, wherein the computer-readable program code is further for sending the second message to a message queue of a target node for the first message.

* * * * *